(12) United States Patent
Tamanuki et al.

(10) Patent No.: US 8,200,096 B2
(45) Date of Patent: Jun. 12, 2012

(54) OPTICAL TRANSCEIVER

(75) Inventors: Takemasa Tamanuki, Seongnam (JP); Won-Seok Jung, Yongin (KR)

(73) Assignee: Opticis Co., Ltd., Seongnam, Gyeonggi-Do (KR)

( * ) Notice: Subject to any disclaimer, the term of this patent is extended or adjusted under 35 U.S.C. 154(b) by 458 days.

(21) Appl. No.: 12/518,093

(22) PCT Filed: Dec. 6, 2007

(86) PCT No.: PCT/KR2007/006312
§ 371 (c)(1),
(2), (4) Date: Jun. 5, 2009

(87) PCT Pub. No.: WO2008/069591
PCT Pub. Date: Jun. 12, 2008

(65) Prior Publication Data
US 2010/0322636 A1 Dec. 23, 2010

(30) Foreign Application Priority Data

Dec. 6, 2006 (KR) .................. 10-2006-0123382

(51) Int. Cl.
*H04B 10/22* (2006.01)
(52) U.S. Cl. ........................ 398/139; 398/135
(58) Field of Classification Search ............ 398/135, 398/139
See application file for complete search history.

(56) References Cited

U.S. PATENT DOCUMENTS

| | | | |
|---|---|---|---|
| 6,540,414 | B1 | 4/2003 | Brezina et al. |
| 6,811,326 | B2 | 11/2004 | Keeble et al. |
| 2003/0020986 | A1* | 1/2003 | Pang et al. ............... 359/152 |
| 2005/0089281 | A1 | 4/2005 | Chiu et al. |
| 2005/0226571 | A1 | 10/2005 | Malagrino, Jr. et al. |

FOREIGN PATENT DOCUMENTS

| | | |
|---|---|---|
| JP | 08043691 | 2/1996 |
| JP | 2001-242350 A | 9/2001 |
| JP | 2002-261265 A | 9/2002 |
| JP | 2002311310 | 10/2002 |
| JP | 2003-502691 A | 1/2003 |
| JP | 2006-108684 A | 4/2006 |
| WO | 0077551 A1 | 12/2000 |
| WO | 2008069591 A1 | 6/2008 |

OTHER PUBLICATIONS

Search Report, Sep. 5, 2008—055526197.

* cited by examiner

*Primary Examiner* — Leslie Pascal
(74) *Attorney, Agent, or Firm* — Nixon Peabody LLP

(57) ABSTRACT

An optical transceiver which converts a plurality of optical signals input from a first side into electrical signals so as to output the electrical signals to a second side and converts a plurality of electrical signals input from the second side into optical signals so as to output the optical signals to the first side.

6 Claims, 6 Drawing Sheets

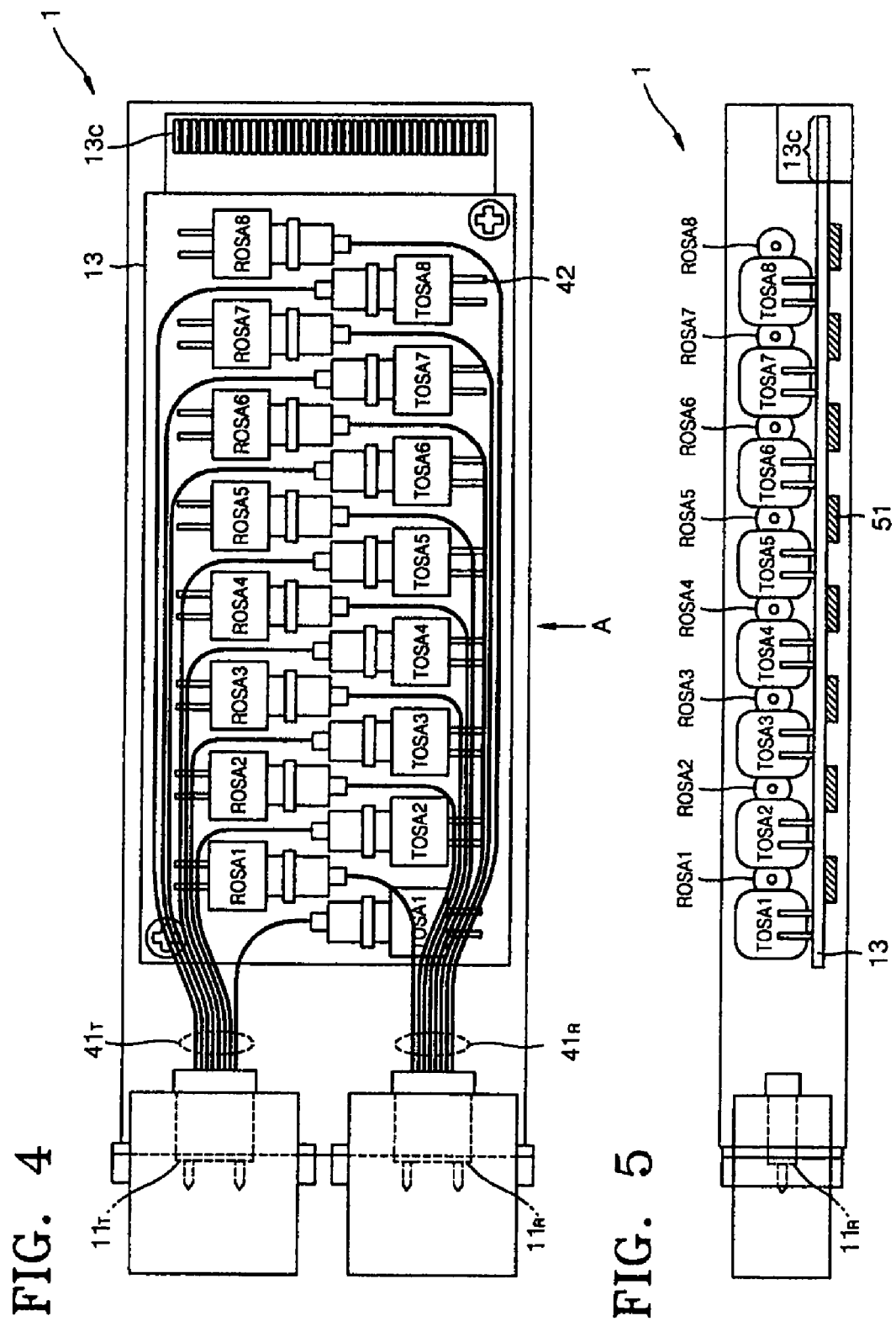

US 8,200,096 B2

OPTICAL TRANSCEIVER

CROSS REFERENCE TO RELATED APPLICATIONS OR PRIORITY CLAIM

This application is a national phase of International Application No. PCT/KR2007/006312, entitled "OPTICAL TRANSCEIVER, which was filed on Dec. 6, 2007, and which claims priority of Korean Patent Application No. 10-2006-0123382, filed Dec. 6, 2006.

TECHNICAL HELD

The present invention relates to an optical transceiver, and more particularly, to an optical transceiver which converts a plurality of optical signals input from a first side into electrical signals so as to output the electrical signals to a second side and converts a plurality of electrical signals input from the second side into optical signals so as to output the optical signals to the first side.

BACKGROUND ART

In a conventional optical transceiver including a plurality of channels, end parts of optical fibers arrays of the channels are arranged to face light receiving device arrays and light emitting device arrays in the optical transceiver. Such an optical transceiver is disclosed in Japanese Patent Application Publication No. 2002-311310.

Since light receiver device arrays and light emitting device arrays are used in a conventional optical transceiver, the following problems exist.

First, optical crosstalk occurs between adjacent channels.

Second, gaps between electrical lines connected to the light receiving device arrays and the light emitting device arrays are small, and thus electrical crosstalk between adjacent channels occurs.

Third, when manufacturing the optical transceiver, it is difficult to arrange the end parts of the optical fiber array to accurately face the light receiving device arrays and the light emitting device arrays, and thus manufacturing costs are high.

DETAILED DESCRIPTION OF THE INVENTION
TECHNICAL PROBLEM

The present invention provides an optical transceiver including a plurality of channels, which prevents optical and electrical crosstalk between channels adjacent to each other and reduces a cost of manufacturing the optical transceiver.

TECHNICAL SOLUTION

According to an aspect of the present invention, there is provided an optical transceiver which converts optical signals of a plurality of channels input from a first side into electrical signals so as to output the electrical signals to a second side and converts electrical signals of a plurality of channels input from the second side into optical signals so as to output the optical signals to the first side, the optical transceiver including: a case; single channel light receiving assemblies located inside the case, comprising light receiving devices for detecting the optical signals of the channels from the first side; and single channel light emitting assemblies located inside the case, comprising tight emitting devices operated by the electrical signals of the channels from the second side.

ADVANTAGEOUS EFFECTS

In an optical transceiver according to the present invention, opto-electric conversion and electro-optic conversion are performed within each of single channel light receiving assemblies and single channel light emitting assemblies located inside a case. Accordingly, the following effects can be obtained.

First, optical crosstalk does not occur between adjacent channels.

Second, since a gap between electrical lines connected to each of the single channel light receiving assemblies and the single channel light emitting assemblies can be widened, electrical crosstalk between adjacent channels can be reduced.

Third, since the end parts of optical fibers do not need to be arranged to face the light receiving devices and the light emitting devices during a process of manufacturing the optical transceiver, manufacturing costs can be reduced.

BRIEF DESCRIPTION OF THE DRAWINGS

FIG. 4 is a plan view illustrating the Inside of the optical transceiver illustrated in FIG. 2, according to an embodiment of the present invention;

FIG. 5 is a side view of the optical transceiver of FIG. 4 from a position Pi in FIG. 4, according to an embodiment of the present invention;

BEST MODE

Figure 1:
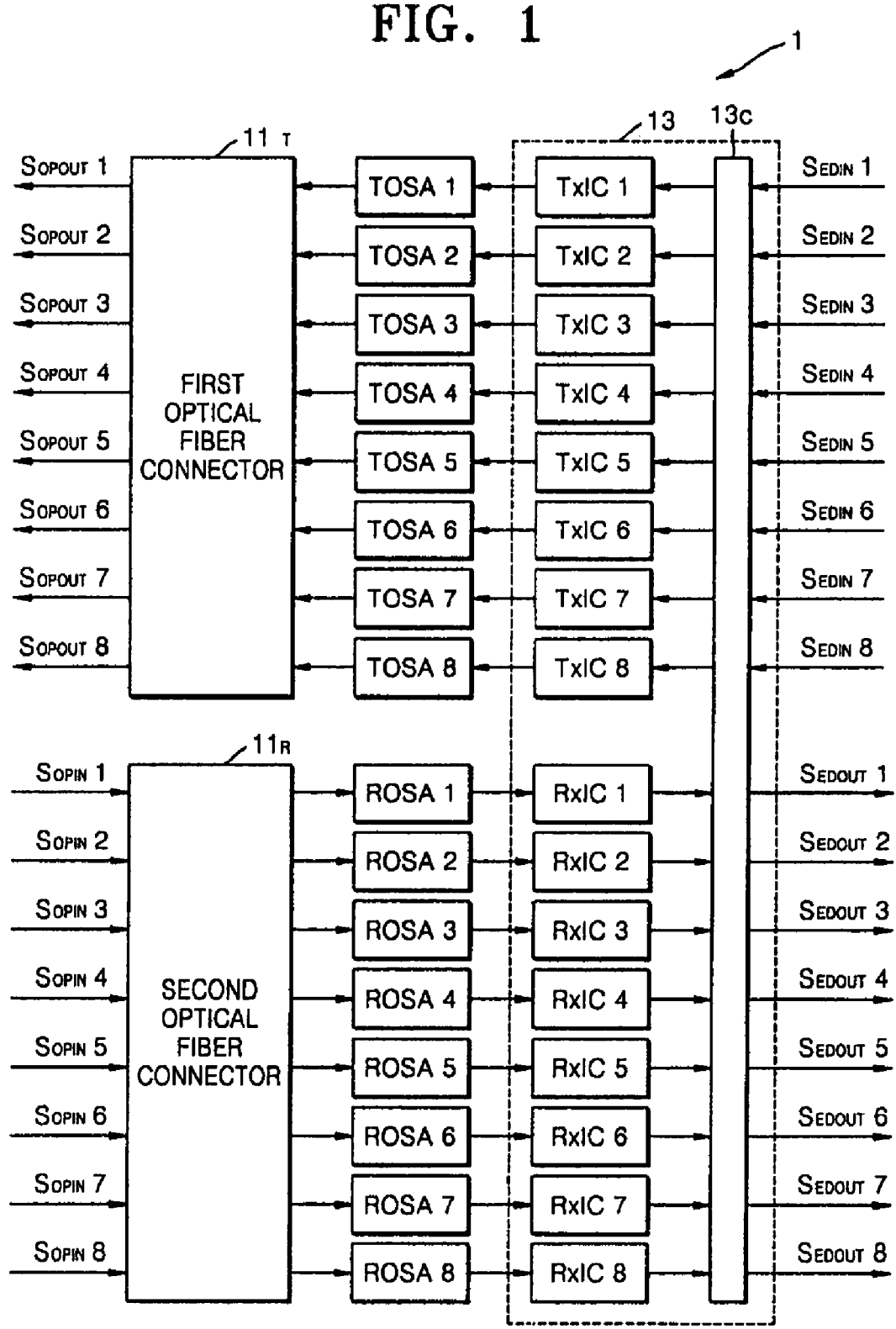
FIG. 1 is a block diagram of an optical transceiver according to an embodiment of the present invention.
Figure 2:
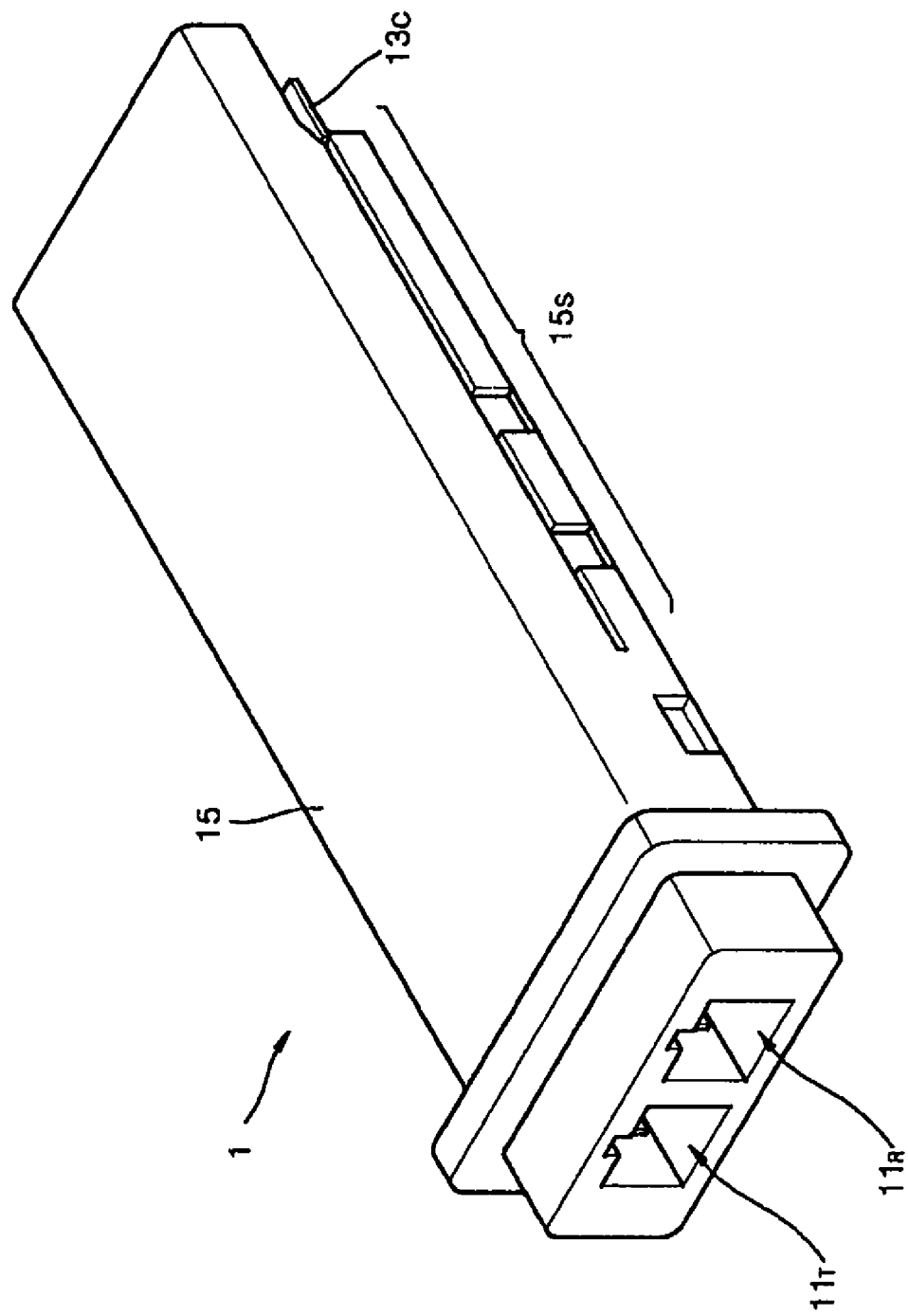
FIG. 2 is a perspective assembled view of the optical transceiver illustrated in FIG. 1, according to an embodiment of the present invention.

FIG. 1 is a block diagram of an optical transceiver 1 according to an embodiment of the present invention and FIG. 2 is a perspective assembled view of the optical transceiver 1 illustrated in FIG. 1, according to an embodiment of the present invention.

Referring to FIGS. 1 and 2, the optical transceiver 1 converts optical signals $S_{OPIN}$ 1 through $S_{OPIN}$ 8 of eight channels from a first side, for example, a server, into electrical signals $S_{EDOUT}$ 1 through $S_{EDOUT}$ 8 so as to output the electrical signals $S_{EDOUT}$ 1 through $S_{EDOUT}$ 8 to a second side, for example, a client, and converts electrical signals $S_{EDIN}$ 1 through $S_{EDIN}$ 8 of eight channels from the second side into optical signals $S_{OPOUT}$ 1 through $S_{OPOUT}$ a so as to output the optical signals $S_{OPOUT}$ through $S_{OPOUT}$ 0 to the first side, The optical transceiver 1 includes a case 15, single channel light receiving assemblies (ROSA) ROSA 1 through ROSA B, and single channel light emitting assemblies (TOSA) TOSA 1 through TOSA 8. Here, ROSA is a well-known single channel light receiving assembly and TOSA is a well-known single channel light emitting assembly.

Each of the single channel light receiving assemblies ROSA through ROSA 8 located. inside the case 15 includes light receiving devices which detect each of the optical signals $S_{OPIN}$ 1 through $S_{OPIN}$ 8 of the eight channels from the first side. Also, each of the single channel light emitting assemblies TOSA 1 through TOSA 8 located inside the case 15 includes light emitting devices operated by the electrical signals $S_{EDIN}$ 1 through $S_{EDIN}$ 8 of the eight channels from the second side.

In other words, opto-electric conversion and electro-optic conversion are respectively performed within each of the single channel Light receiving assemblies ROSA 1 through ROSA 8 and the single channel light emitting assemblies TOSA 1 through TOSA 8 located inside the case 15.

A first optical-fiber array connector $11_T$ and a second optical-fiber array connector $11_R$ are installed in the first side of the case 15. Accordingly, the optical signals $S_{OPOUT}$ 1 through $S_{OPOUT}$ 8 are output to the first side from the single channel light emitting assemblies TOSA 1 through TOSA 8 through the first optical-fiber array connector $11_T$. In addition, the optical signals $S_{OPIN}$ 1 through $S_{OPIN}$ 8 are input to the single channel light receiving assemblies ROSA 1 through ROSA 8 from the first side through the second optical-fiber array connector $11_R$.

A circuit substrate 13 is installed in the case 15. The circuit substrate 13 includes transmitting buffers TxIC 1 through TxIC 8 and receiving buffers RxIC 1 through RxIC a therein. In addition, an electrical connector $13_c$ is installed in the second side of the case 15, that is, an end part of the circuit substrate 13.

The electrical signals $S_{EDOUT}$ 1 through $S_{EDOUT}$ 8 are output to the second side from the single channel light receiving assemblies ROSA 1 through ROSA 8 through the receiving buffers RxIC 1 through RxIC 8 and the electrical connector $13_c$. In addition, the electrical $S_{EDIN}$1 through $S_{EDIN}$, 8 are input to the single channel light emitting assemblies TOSA 1 through TOSA 8 from the second side through the electrical connector $13_c$ and the transmitting buffers TxIC 1 through TxIC 8.

The optical transceiver 1 also includes a guide slot part $15_s$ disposed in a length direction the case 15. A detailed description thereof will be provided with reference to FIG. 3.

Figure 3:
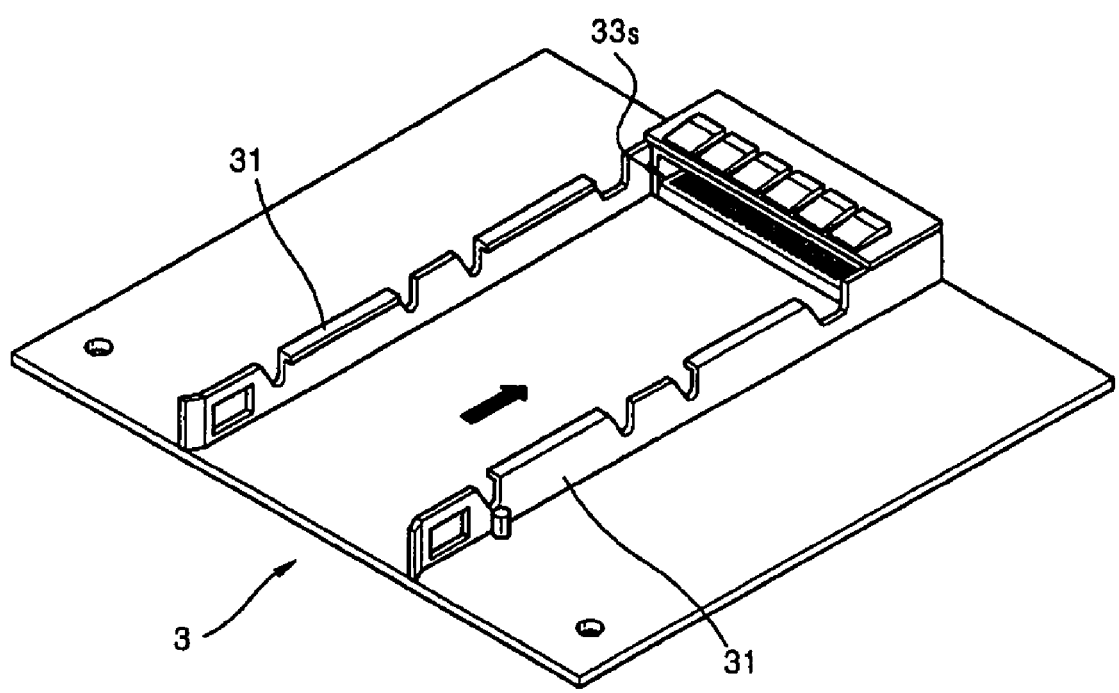
FIG. 3 is a perspective view of a circuit device for accommodating the optical transceiver illustrated in FIG. 2, according to an embodiment of the present invention.

FIG. 3 is a perspective view of a circuit device 3 for accommodating the optical transceiver 1 illustrated in FIG. 2, according to an embodiment of the present invention.

Referring to FIGS. 2 and 3, the circuit device 3 for accommodating the optical transceiver 1 according to an embodiment of the present invention is included in a system at the second side, for example, a client system. The circuit device 3 includes a guide rail part 31 and a connector-slot $33_s$. That is, the guide rail part 31 included in the circuit device 3 is formed to correspond to the guide slot part $15_s$ of the optical transceiver 1 and the connector-slot $33_s$ included in the circuit device 3 is formed to correspond to the electrical connector $13_c$ of the optical transceiver 1. Accordingly, the optical transceiver 1 according to an embodiment of the present invention can be conveniently inserted into and installed in the circuit device 3.

FIG. 4 is a plan view illustrating the inside of the optical transceiver 1 illustrated in FIG. 2, according to an embodiment of the present invention, and FIG. 5 is a side view of the optical transceiver 1 from a position A in FIG. 4, according to an embodiment of the present invention_In FIGS. 4 and 5, reference numerals $41_T$, $41_R$, 42, and 51 respectively denote transmitting optical fiber lines, receiving optical fiber lines, leads, and the transmitting buffers TxIC 1 through TxIC 8 of FIG. 1.

Referring to FIGS. 4 and 5, the receiving buffers (RxIC 1 through RxIC 8 of FIG. 1) and the transmitting buffers 51 (TxIC 1 through TxIC 8 of FIG. 1) are disposed on the lower surface of the circuit substrate 13. In addition, the single channel light receiving assemblies ROSA 1 through ROSA 8 and the single channel light emitting assemblies TOSA 1 through TOSA 8 are disposed on the upper surface of the circuit substrate 13.

Referring to FIGS. 1, 2, 4, and 5, opto-electric conversion and electro-optic conversion are respectively performed within each of the single channel light receiving assemblies ROSA 1 through ROSA 8 and the single channel light emitting assemblies TOSA 1 through TOSA 8 located inside the case 15, as described above. Accordingly, the following effects can be obtained as described below.

First, optical crosstalk does not occur between adjacent channels.

Second, since a gap between electrical lines, for example, leads 42, connected to each of the single channel light receiving assemblies ROSA 1 through ROSA 8 and the single channel light emitting assemblies TOSA 1 through TOSA 8 can be widened, electrical crosstalk between channels adjacent to each other can be reduced.

Third, since the end parts of the transmitting and receiving optical fibers $41_T$ and $41_R$ do not need to be arranged to face the single channel light receiving assemblies ROSA 1 through ROSA 8 and the single channel light emitting assemblies TOSA 1 through TOSA 8 during a process of manufacturing the optical transceiver 1, manufacturing costs can be reduced.

MODE OF THE INVENTION

Figure 6:
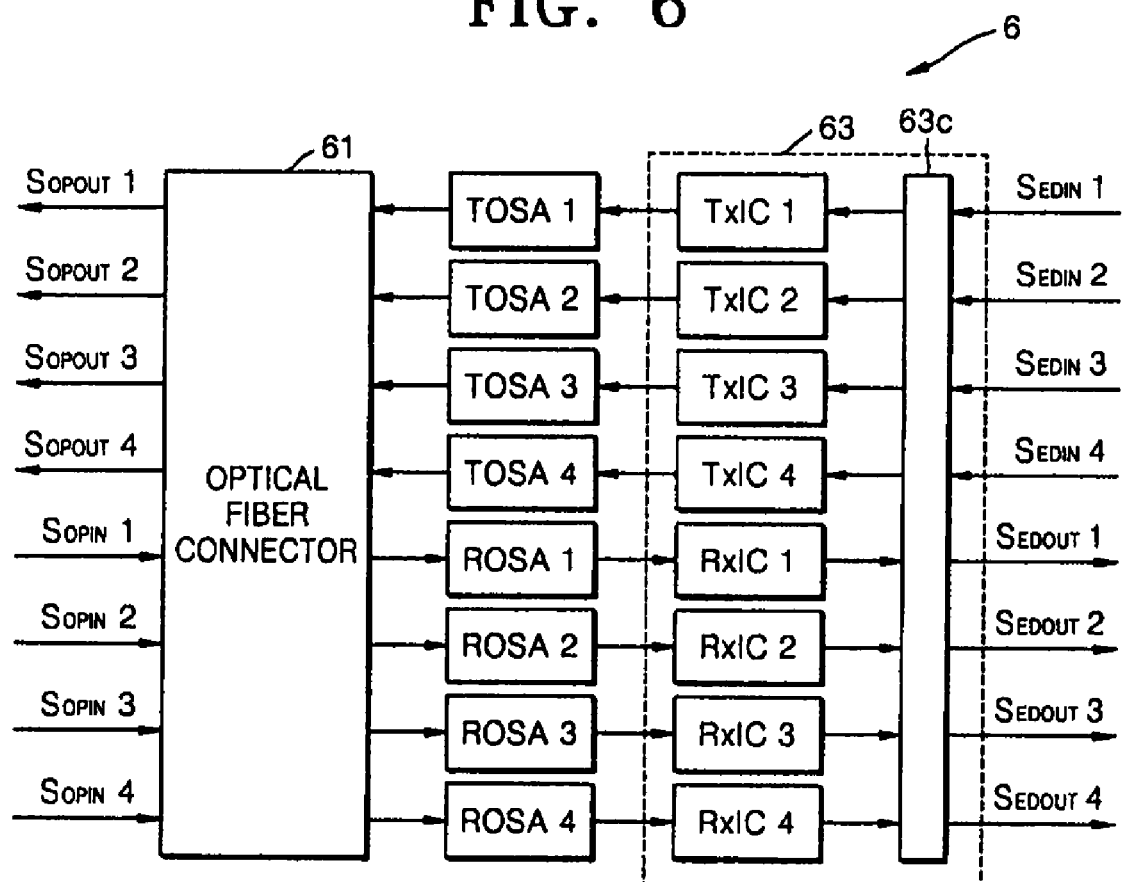
FIG. 6 is a block diagram of an optical transceiver according to another embodiment of the present invention.

FIG. 6 is a block diagram of an optical transceiver 6 according to another embodiment of the present invention.

Figure 7:
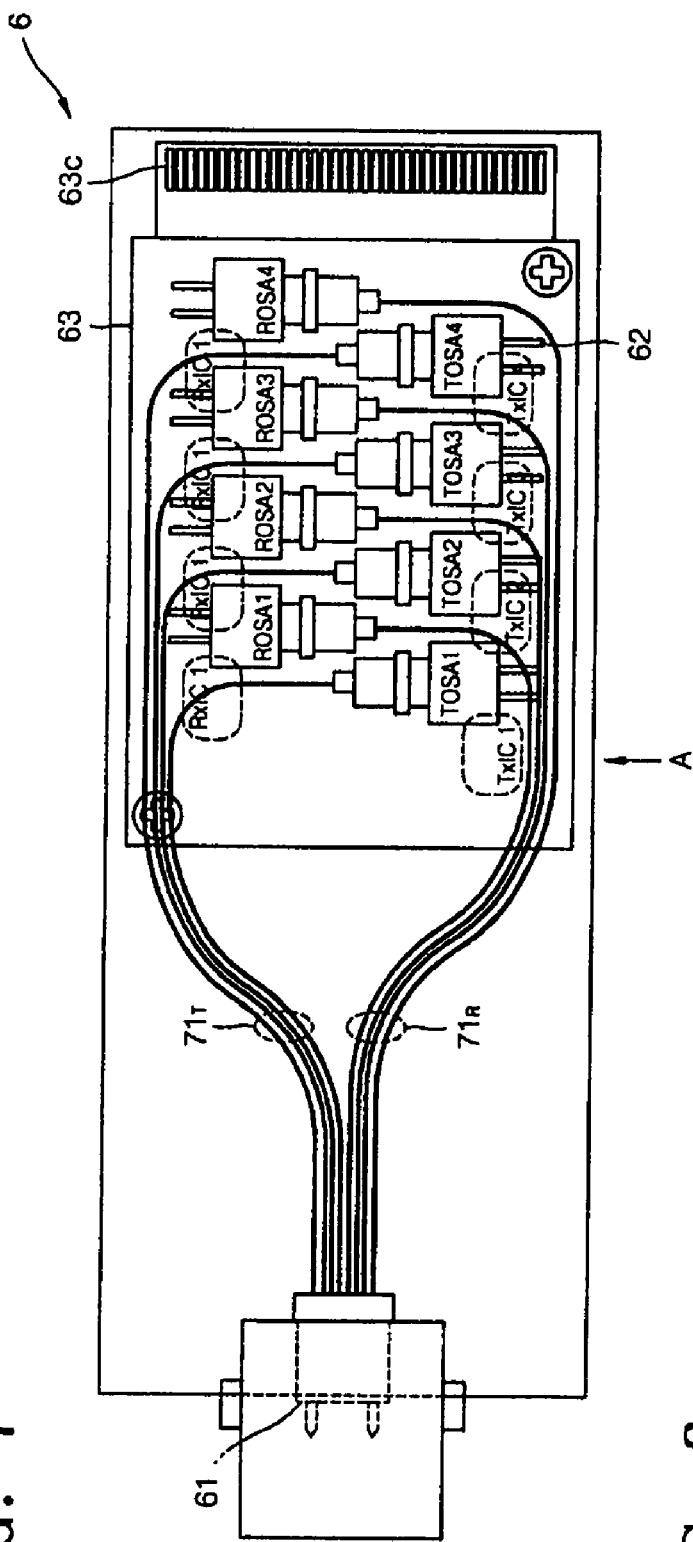
FIG. 7 is a plan view illustrating the inside of the optical transceiver illustrated in FIG. 6, according to another embodiment of the present invention.
Figure 8:
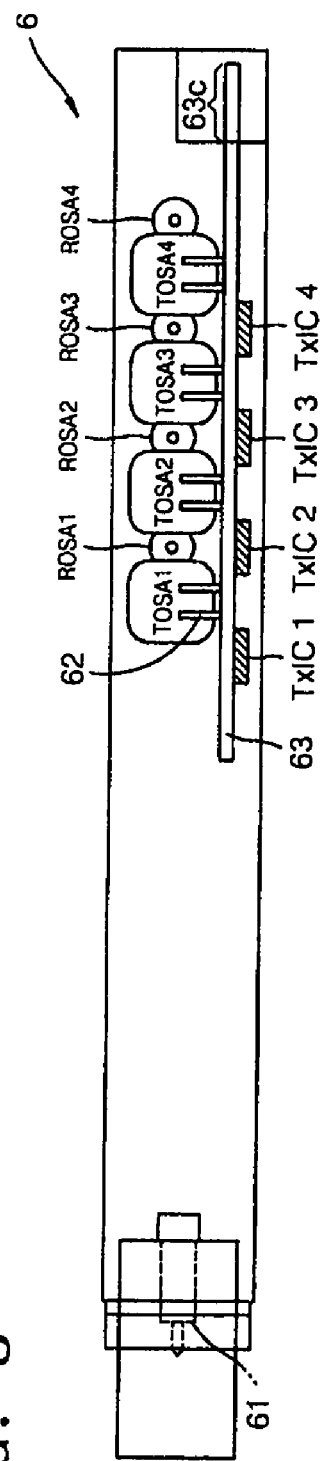
FIG. 8 is a side view of the optical transceiver of FIG. 6 from a position A in FIG. 7, according to another embodiment of the present invention.

The optical transceiver 6 illustrated in FIG. 6 is installed in a reduced form of the assembled optical transceiver 1 illustrated in FIG. 2 and thus a related description thereof is omitted. FIG. 7 is a plan view illustrating the inside of the optical transceiver 6 illustrated in FIG. 6, according to another embodiment of the present invention, and FIG. 8 is a side view of the optical transceiver 6 of FIG. 7 from a position A in FIG. 7, according to another embodiment of the present invention. The reference numerals that are the same as those of FIG. 1 included in FIGS. 6 through 8 denote the same function and elements. The reference numeral 62 in FIG. 7 denotes electrical leads.

Referring to FIGS. 6 through 8. the optical transceiver 6 converts optical signals $S_{OPIN}$ 1 through $S_{OPIN}$ 4 of four channels from a first side, for example, a server, into electrical signals $S_{EDOUT}$ 1 through $S_{EDOUT}$ 4 so as to output the electrical signals $S_{EDOUT}$1 through $S_{EDOUT}$4 to a second side, for example, a client, and converts electrical signals $S_{EDIN}$ 1 through $S_{EDIN}$ 4 of four channels from the second side into optical signals $S_{OPOUT}$1 through $S_{OPOUT}$4 so as to output the optical signals $S_{OPOUT}$ 1 through $S_{OPOUT}$ 4 to the first side.

The optical transceiver 6 includes single channel light receiving assemblies ROSA 1 through ROSA 4 and single channel light emitting assemblies TOSA 1 through TOSA 4.

Here, ROSA is a well-known single channel light receiving assembly and TOSA is a well-known single channel light emitting assembly.

Each of the single channel light receiving assemblies ROSA 1 through ROSA 4 includes light receiving devices which detect each of the optical signals $S_{OPIN}$ 1 through $S_{OPIN}$ 4 of the four channels from the first side. Also, each of the single channel light emitting assemblies TOSA 1 through TOSA 4 includes light emitting devices operated by the electrical signals $S_{EDIN}$ 1 through $S_{EDIN}$ 4 of the four channels from the second side.

In other words, opto-electric conversion and electro-optic conversion are respectively performed within each of the single channel light receiving assemblies ROSA 1 through ROSA 4 and the single channel light emitting assemblies TOSA 1 through TOSA 4.

The optical signals $S_{OPOUT}$ 1 through $S_{OPOUT}$ 4 are output to the first side from the single channel light emitting assemblies TOSA 1 through TOSA 4 through an optical-fiber array connector 61, In addition, the optical signals $S_{OPIN}$ 1 through $S_{OPIN}$ 4 are input to the single channel light receiving assemblies ROSA 1 through ROSA 4 from the first side through the optical-fiber array connector 61.

The optical receiver 6 also includes a circuit substrate 63. Transmitting buffers TxiC 1 through TxIC 4 and receiving buffers RxIC 1 through RxIC 4 are mounted on the circuit substrate 63. In addition, an electrical connector 63$_c$ is formed on one end part of the circuit substrate 63.

The electrical signals $S_{EDOUT}$ 1 through $S_{EDOUT}$ 4 are output to the second side from the single channel light receiving assemblies ROSA 1 through ROSA 4 through the receiving buffers RxIC 1 through RxIC 4 and the electrical connector 63c. In addition, the electrical signals $S_{EDIN}$ 1 through $S_{EDIN}$ 4 are input to the single channel light emitting assemblies TOSA 1 through TOSA 4 from the second side through the electrical connector 63, and the transmitting buffers Tx1C 1 through TxIC 4.

The receiving buffers RxIC 1 through RxIC 4 and the transmitting buffers Tx1C 1 through TxIC 4 are disposed on the lower surface of the circuit substrate 63. In addition, the single channel light receiving assemblies ROSA "I through ROSA 4 and the single channel light emitting assemblies TOSA 1 through TOSA 4 are disposed on the upper surface of the circuit substrate 63.

The invention claimed is:

1. An optical transceiver which converts optical signals of a plurality of channels input from a first side into electrical signals so as to output the electrical signals to a second side and converts electrical signals of a plurality of channels input from the second side into optical signals so as to output the optical signals to the first side, the optical transceiver comprising:
    a case;
    each of single channel light receiving assemblies located inside the case, comprising a light receiving device for detecting an optical signal of a channel from the first side;
    each of single channel light emitting assemblies located inside the case, comprising a light emitting device operated by an electrical signal of a channel from the second side;
    a first optical-fiber array connector installed in the first side of the case; and
    a second optical-fiber array connector installed in the first side of the case;
    wherein:
    each of the single channel light emitting assemblies is connected to the first optical-fiber array connector via a transmitting optical fiber line; and
    each of the single channel light receiving assemblies is connected to the second optical-fiber array connector via a receiving optical fiber line.

2. The optical transceiver of claim 1, wherein the single channel light receiving assemblies are receiver optical sub-Assemblies (ROSA) and the single channel light emitting assemblies are transmitter optical sub-assemblies (TOSA).

3. The optical transceiver of claim 1, wherein:
    the optical signals output to the first side from each of the single channel light emitting assemblies through the transmitting optical fiber lines and the first optical-fiber array connectors; and
    the optical signals input to each of the single channel light receiving assemblies from the first side through the second optical-fiber array connector and the receiving optical fiber lines.

4. The optical transceiver of claim 3, wherein the case comprises an electrical connector on the second side, the electrical signals output to the second side from each of the single channel light receiving assemblies through receiving buffers and the electrical connector, and the electrical signals input to each of the single channel light emitting assemblies from the second side through the electrical connector and transmitting buffers.

5. The optical transceiver of claim 4, wherein the case comprises a circuit substrate on which, the receiving buffers and the transmitting buffers are disposed on a lower surface thereof and the single channel light receiving assemblies and the single channel light emitting assemblies are disposed on an upper surface thereof.

6. The optical transceiver of claim 5, wherein the electrical connector is formed on an end part of the circuit substrate.

* * * * *